(12) United States Patent
Farmer et al.

(10) Patent No.: US 8,793,047 B2
(45) Date of Patent: Jul. 29, 2014

(54) SYSTEM AND METHOD FOR VEHICLE SPINOUT DETECTION

(75) Inventors: Shweta B. Farmer, Keego Harbor, MI (US); Jialiang Le, Canton, MI (US); Todd N. Clark, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 433 days.

(21) Appl. No.: 13/071,447

(22) Filed: Mar. 24, 2011

(65) Prior Publication Data
US 2012/0245790 A1    Sep. 27, 2012

(51) Int. Cl.
*B60Q 1/00* (2006.01)
*B60Q 5/00* (2006.01)
*G06F 19/00* (2011.01)

(52) U.S. Cl.
USPC .................. 701/29.1; 701/30.2; 701/31.9

(58) Field of Classification Search
USPC ......................... 701/29, 30.2, 31.9
See application file for complete search history.

(56) References Cited

U.S. PATENT DOCUMENTS

| | | | |
|---|---|---|---|
| 6,453,226 B1* | 9/2002 | Hac et al. | 701/48 |
| 2002/0016653 A1* | 2/2002 | Levine | 701/1 |
| 2005/0125208 A1* | 6/2005 | Boyd et al. | 703/8 |

\* cited by examiner

*Primary Examiner* — John Q Nguyen
*Assistant Examiner* — Kyung Kim
(74) *Attorney, Agent, or Firm* — Joseph E. Root

(57) ABSTRACT

A method for vehicle spinout detection is described. The method includes monitoring a set of conditions. If the conditions meet a set of criteria, the method calculates a lateral factor, employing one or more past values of the lateral factor. The lateral factor indicates the vehicle's lateral velocity. Then, a spinout factor is computed based on the calculated lateral factor. The spinout factor indicates the difference between the direction of vehicle travel and the direction the vehicle is heading. If the spinout factor is above a predefined threshold value, the method generates a warning signal. A system for vehicle spinout detection is also described.

16 Claims, 4 Drawing Sheets

SYSTEM AND METHOD FOR VEHICLE SPINOUT DETECTION

BACKGROUND

This application relates generally to automobile technology and more particularly to warning systems in vehicles.

Vehicle spinout detection is a safety feature designed to determine whether the vehicle has spun out of control, which becomes especially important during low visibility weather conditions. Robust calculation of the vehicle's lateral velocity (or side slip angle) is important for spinout detection systems. During spinout events, lateral velocity is necessary to detect an unstable vehicle, which may have normal yaw rates. Also in these events, the longitudinal vehicle velocity cannot be accurately measured by wheel speed because of excessive wheel slip. Therefore, a successful spinout detection system must involve an accurate determination of the vehicle lateral and longitudinal velocities. Although it is possible to measure vehicle velocities directly by using dedicated measuring devices such as optical sensors and GPS, there exist practical issues such as cost, accuracy, and reliability that prevent the use of such devices on vehicles.

Lateral velocity calculation algorithms implemented on vehicles for vehicle spinout detection are normally based on sensors and generally involve mathematical integration of lateral acceleration and other related variables. Such calculation, however, introduces errors over time due to integration and the inability to measure lateral acceleration directly. These errors can be so substantial that the calculation and subsequent spinout detection is compromised.

It would be highly desirable to develop a cost-effective strategy for improved discrimination between vehicle spinout and non-spinout events by utilizing already-available signals in vehicles, without adding additional hardware.

SUMMARY

One embodiment of the present application describes a method for vehicle spinout detection. The method includes monitoring a set of conditions. If the conditions meet a set of criteria, the method calculates a lateral factor, which indicates the vehicle's lateral velocity. The lateral factor calculation employs one or more past values of the lateral factor. Then, a spinout factor is computed based on the calculated lateral factor. The spinout factor indicates the difference between the direction of vehicle travel and the direction the vehicle is heading. If the spinout factor is above a predefined threshold value, the method generates a warning signal.

Another embodiment of the present application discloses a system for vehicle spinout detection. The system includes a monitoring module to monitor a set of conditions. If the conditions meet a set of criteria, a calculation module calculates a lateral factor, which indicates the vehicle's lateral velocity. The lateral factor calculation employs one or more past values of the lateral factor. The spinout factor indicates the difference between the direction of vehicle travel and the direction the vehicle is heading. A computation module computes a spinout factor based on the calculated lateral factor and if the spinout factor is above a predefined threshold value, a warning module generates a warning signal.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

The present disclosure provides methods and systems for discriminating spinout events from non-spinout events, utilizing sensor signals and information already present in vehicles, obviating the need for adding additional sensors.

In general, the described methods and systems relate to vehicle spinout detection. Vehicle systems monitor a set of conditions and if the conditions meet a set of criteria, calculate a lateral factor. Based on the calculated lateral factor, a spinout factor is computed. If the spinout factor is above a predefined threshold value, the method generates a warning signal informing surrounding vehicles of vehicle spinout.

Exemplary Embodiments

Figure 1:
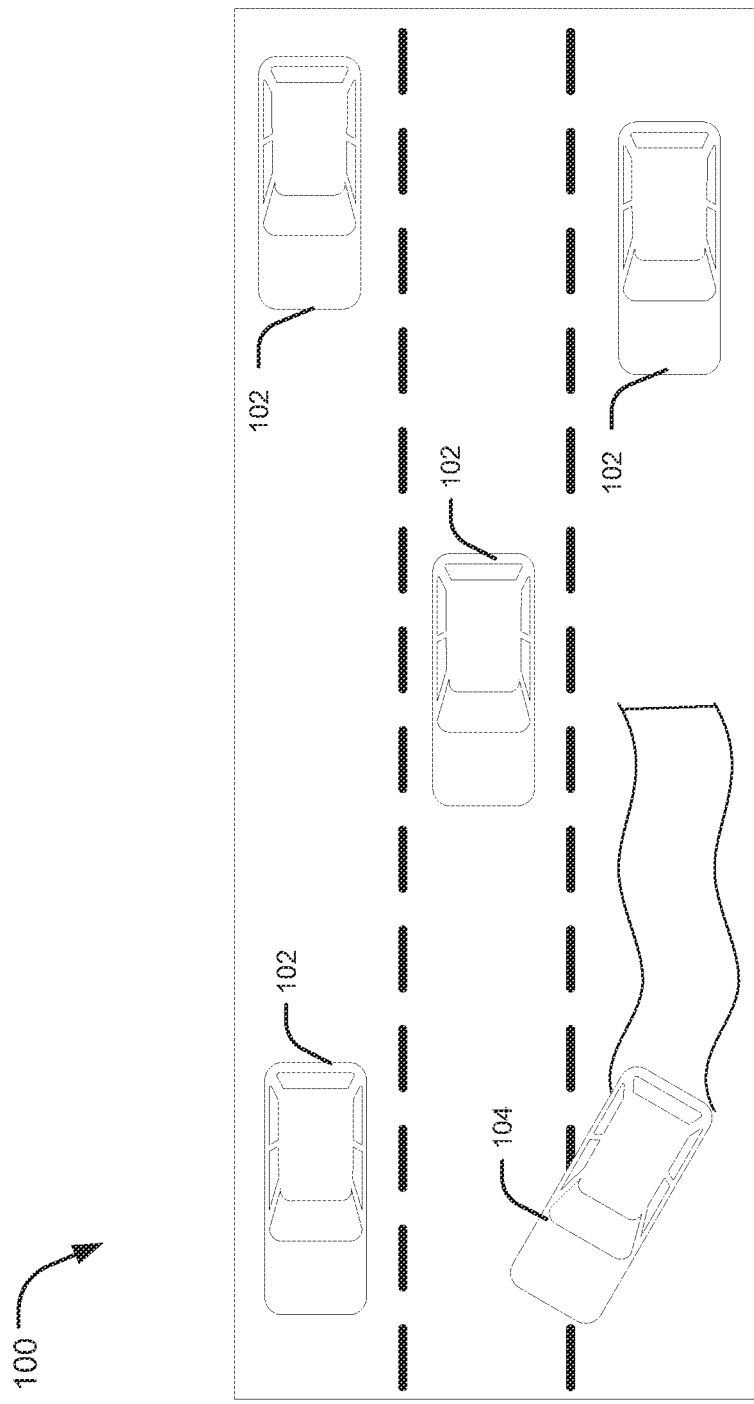
FIG. 1 illustrates a spinout event on a road with travelling vehicles.

FIG. 1 illustrates a spinout event 100 where vehicles 102 and 104 are travelling on a road. The vehicle 104 is shown as experiencing a spinout event where the vehicle 104 spins out of control. The unsteady path of the vehicle 104 travel in FIG. 1 indicates that it is not responding as required to driver input such as steering wheel input.

Figure 2:
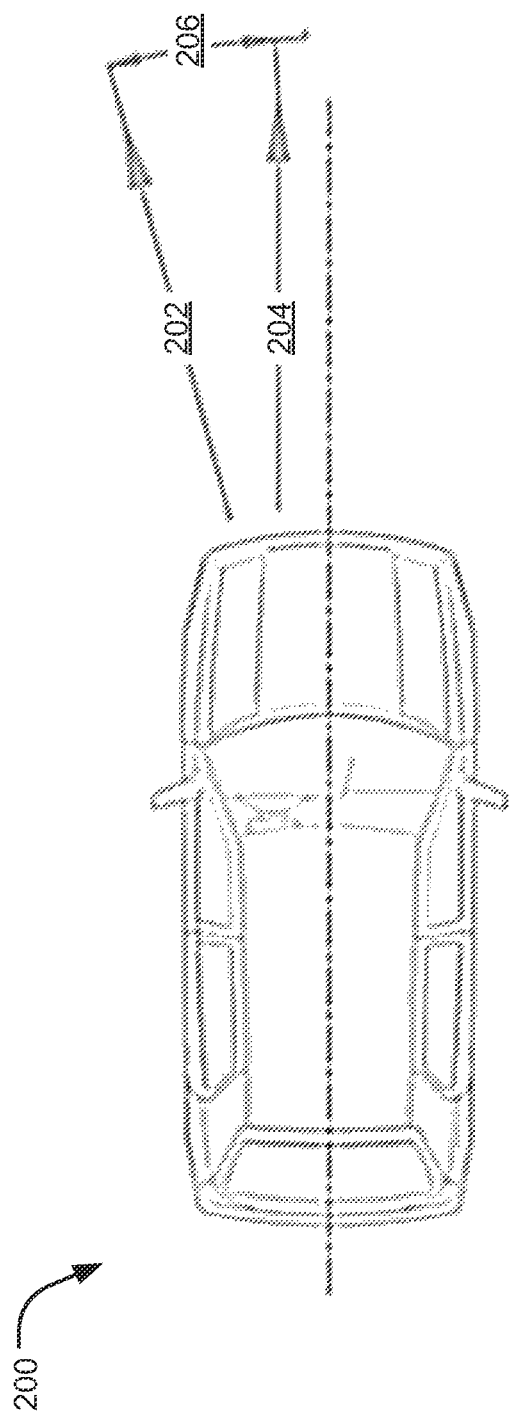
FIG. 2 illustrates spinout factor with respect to a vehicle's travel.

The elements of the disclosure set out here determine when a vehicle is spinning out by calculating a spinout factor. More specifically, spinout factor 206, $\lambda$, is calculated by determining inverse tangent of lateral factor divided by longitudinal velocity and then converting this value from radians to degrees. Spinout factor provides as estimate of the angle between the direction of vehicle travel 202 and the direction the vehicle is heading 204, as shown in FIG. 2.

The spinout factor 206 computation may be performed according to equation 1:

$$\lambda = \left(\frac{160}{\pi}\right) \cdot \tan^{-1} \frac{\text{lateral factor}}{\text{longitudinal velocity}} \quad (1)$$

The input signals used to calculate spinout factor 206 are longitudinal velocity, lateral acceleration, steering wheel angle, and yaw rate; and the output signal is the spinout factor 206. Vehicle longitudinal velocity can be calculated in several ways, such as by computing forward velocity from an algorithm based on wheel speeds or by vehicle speed from the powertrain control module. The lateral factor calculation will be described in detail in relation with FIGS. 3 and 4.

Figure 3:
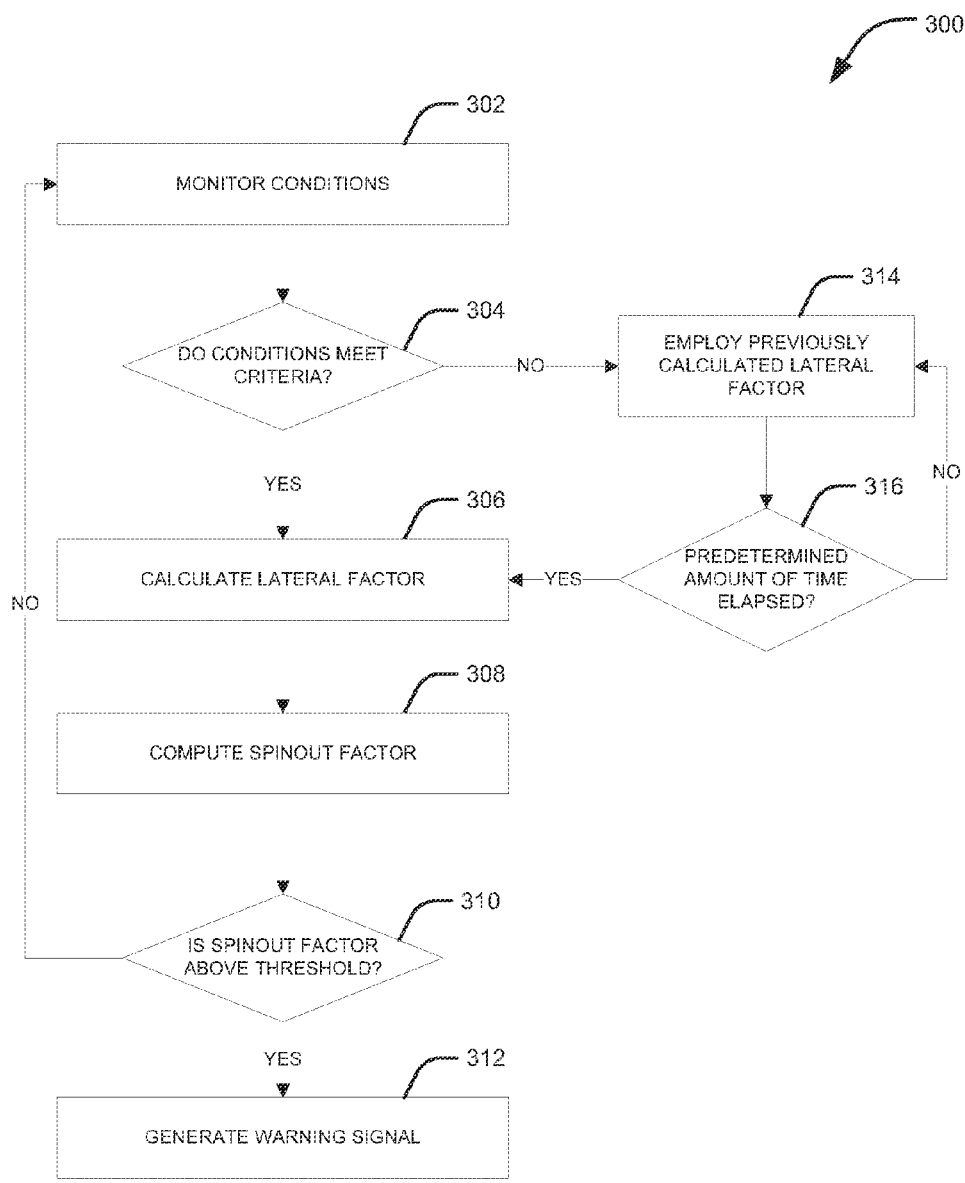
FIG. 3 outlines a method for vehicle spinout detection according to the present disclosure.

FIG. 3 outlines a method 300 for vehicle spinout detection. At step 302, the method 300 monitors a set of conditions, which may include, without limitation, steering wheel angle, yaw rate, transmission gears, ignition status, lateral acceleration, wheel speeds, or longitudinal vehicle speed.

If it is determined, at step 304, that the monitored conditions meet a set of criteria, the method 300 calculates a lateral factor at step 306. Here, the "conditions meeting a set of criteria" implies that the vehicle may be experiencing a spinout event. For example, the method 300 may monitor conditions including the steering wheel angle rate and yaw rate of the vehicle. One criterion is that the steering wheel angle rate is not zero and the yaw rate is above a first predefined threshold value, suggesting that the vehicle is not stable. Another criterion is that the steering wheel angle rate is zero for more than a threshold period of time and the yaw rate is above a second predefined threshold value, suggesting that in spite of no change in steering angle for a certain period of time, the vehicle is moving in an unstable manner. Either criterion may imply a spinout event.

If it is determined at step 304, that either criterion is met, the method 300 calculates the lateral factor at step 306, according to equation 2:

$$\text{lateral factor}(t) = \text{lateral factor}(t-1) + \int (a_y - \omega_z + v_x) dt \quad (2)$$

In equation 2, $a_y$ is the lateral acceleration, $v_x$ is the forward velocity of the vehicle, and $\omega_z$ is vehicle yaw rate. Lateral factor (t−1) represents the value of the lateral factor at an earlier time t−1, although in other embodiments, more than one previous lateral factor value may be employed during lateral factor calculation.

It should be noted that while the lateral factor is not lateral velocity, it does provide all the relevant information needed for the calculation of spinout factor and the detection of vehicle spinout conditions.

In the present embodiment, the lateral factor is calculated based on a state-based approach, which prevents aggregation of errors over time. If the set of criteria is not met at step 304, a default state utilizes the previously calculated value of the lateral factor to determine spinout at step 314. Equation 3 represents the default state:

$$\text{lateral factor}(t) = \text{lateral factor}(t-1) \quad (3)$$

Further, the method 300 may stay in the default state only for a predetermined period of time. At step 316, if the method 300 perceives that the predetermined time period has lapsed, the lateral factor is calculated again, by proceeding to the step 306.

As already discussed, if the set of criteria is met, the method 300 switches to another state, represented by the equation 2. Such a state-based approach provides improved discrimination between spinout and non-spinout events. The lateral factor calculation is required only when the set of criteria is met, as opposed to frequent repeated calculation. Naturally, the calculation effort is reduced significantly. This improved discrimination results in significantly less data being used for lateral factor estimation, thereby dramatically reducing the opportunity for long-term integration and measurement errors.

Once the lateral factor is calculated, the method 300 computes spinout factor at step 308, which, in some implementations, employs equation 1. If the spinout factor is above a predetermined threshold, the method 300 concludes that a spinout event is occurring at step 310. In response, a warning signal is generated at step 312, which may be a visual or an audible signal, for surrounding vehicles, indicating vehicle spinout. For example, the emergency flashers can be activated automatically upon determining that a spinout is occurring, thus preventing accidents. This feature can be especially useful under low visibility conditions. At step 310, if the spinout factor is below the threshold, the method 300 returns to step 302.

Alternate embodiments of the method 300 may have other sets of criteria that need to be met. Table 1 shows another example of the state-based approach for calculating the lateral factor:

TABLE 1

Example of state-based approach for calculating lateral factor

| | |
|---|---|
| State 1 | Set of criteria to be met: Vehicle Speed > threshold, Change in Velocity < threshold, Yaw Rate > threshold, and Yaw Rate Change > threshold. If this set of criteria is met, calculate lateral factor using equation 2 |
| Default state | Employed when set of criteria are not met. Increment 'default counter' by one. If 'default counter' > threshold, then lateral factor(t) = 0 Else utilize equation 3 for calculating lateral factor |

Table 1 shows that the state machine has a default state that counts the number of times the state machine has calculated the lateral factor through a variable 'default counter'. In essence, the default state ensures that if the lateral factor has been calculated a certain number of times based on the previous lateral factor value, the lateral factor may be assigned a constant value such as zero, as shown in Table 1. As such, the next time the lateral factor is calculated, the previous errors will not be aggregated in the calculation.

Various other sets of criteria may be employed in other implementations of the present disclosure for calculating the lateral factor. A few sets of criteria are presented in Table 2 below:

TABLE 2

Examples of sets of criteria for lateral factor calculation

| Set No. | Set of criteria to be met |
|---|---|
| Set 1 | Vehicle Speed > threshold, Change in Velocity < threshold and Yaw Rate > threshold and Steering Wheel Angle < threshold. If this set of criteria is met, calculate lateral factor using equation 2 |
| Set 2 | Vehicle Speed > threshold, Steering Wheel Angle > threshold and Yaw Rate < -threshold and Change in Yaw Rate > threshold and |Steering Wheel Angle| < threshold. If this set of criteria is met, calculate lateral factor using equation 2 |
| Set 3 | Vehicle Speed > threshold, Steering Wheel Angle < -threshold and Yaw Rate > threshold and Change in Yaw Rate > threshold and |Steering Wheel Angle| < threshold. If this set of criteria is met, calculate lateral factor using equation 2 |

It should be understood that one or more of the sets of criteria described so far may be employed for calculating the lateral factor. Other sets of criteria for such calculation are also possible without departing from the scope or the purpose of the claimed invention. Within each criterion (for example, vehicle speed>threshold), a condition ('vehicle speed') is limited by a threshold ('>threshold'). Further, it should be understood that the 'threshold' values identified for each condition relate to that particular condition only. For example, the threshold for the vehicle speed condition will be different from the threshold of the steering wheel angle condition, although the term 'threshold' is employed for both. Threshold values may be calculated from collecting input signal data from spinout and non-spinout events. The threshold value for each criterion may be determined through field testing or computer simulations.

Figure 4:
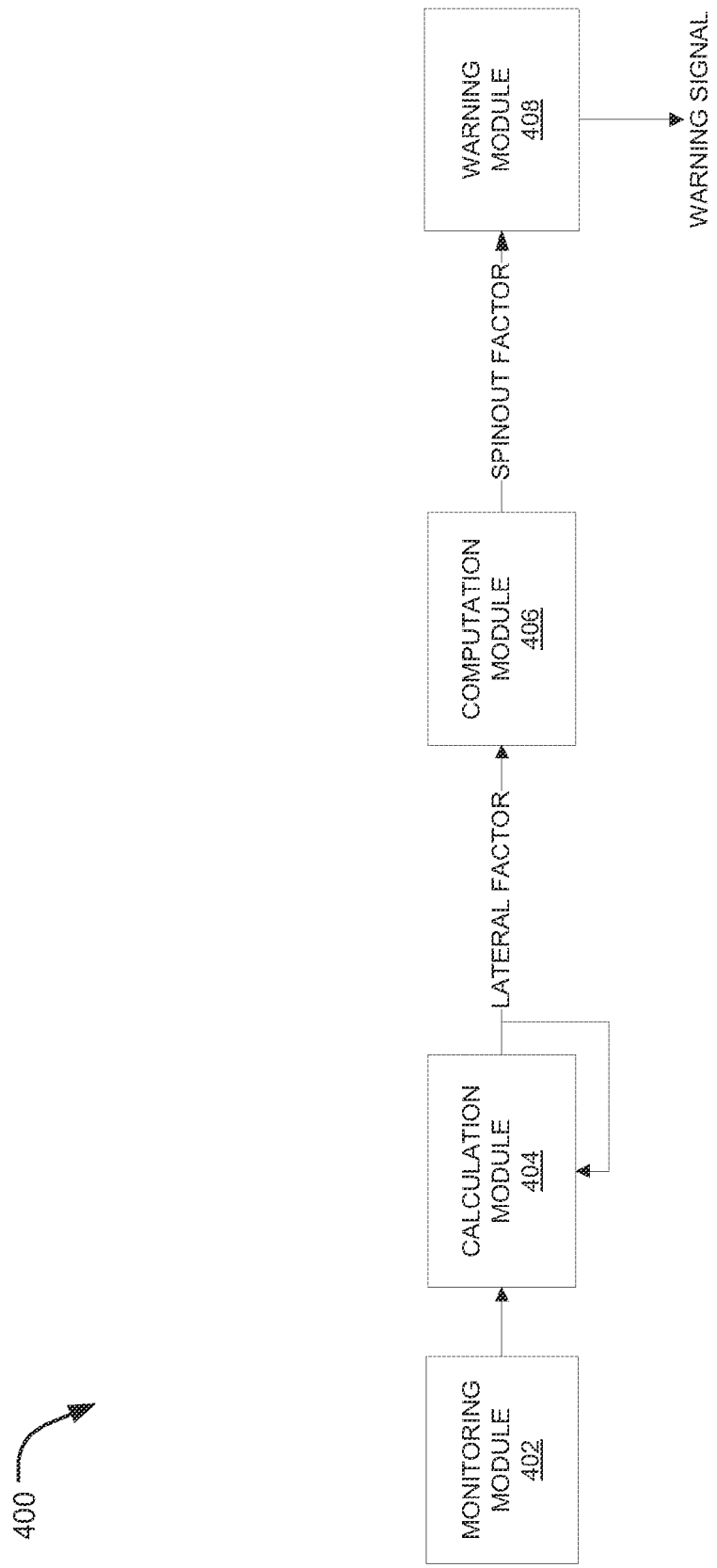
FIG. 4 outlines a system for vehicle spinout detection according to the present disclosure.

FIG. 4 outlines a system 400 for vehicle spinout detection. The system 400 may be utilized for implementing the method 300.

A monitoring module 402 monitors a set of conditions, which may include, without limitation, steering wheel angle, yaw rate, transmission gears, ignition status, lateral acceleration, wheel speeds, or longitudinal vehicle speed.

A calculation module 404 calculates lateral factor if the conditions meet a set of criteria. Meeting this set of criteria may indicate that the vehicle's response to the steering wheel angle is outside a permissible limit. Further, the calculation module 404 employs one or more previously calculated values of the lateral factor, as indicated by the feedback arrow in FIG. 4. The calculation module 404 may employ a state-based approach to calculate the lateral factor. One example of such an approach is shown in Table 3 below:

TABLE 3

Example of state-based approach for calculating lateral factor

| | |
|---|---|
| State 1 | Set of criteria to be met: Steering Wheel Angle Rate ≠ 0 and Yaw Rate > a predetermined threshold, or Steering Wheel Angle Rate = 0 for a threshold period of time and Yaw Rate > a predetermined threshold. If this set of criteria is met, calculate lateral factor using equation 2 |
| Default state | Employed when set of criteria are not met. Utilize equation 3 for calculating lateral factor |

The system 400 includes a computation module 406 that computes a spinout factor based on the calculated lateral factor. This computation may be performed according to equation 1, in some implementations. If the spinout factor is above a predetermined threshold, a warning module 408 concludes that a spinout event is occurring at step 310 and generates a warning signal, which may be a visual or an audible signal, informing surrounding vehicles of vehicle spinout. For example, the emergency flashers can be automatically activated upon determining that a spinout is occurring, thus preventing accidents.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A method for detecting spinout on an automotive vehicle, comprising:
  monitoring a set of conditions on the vehicle, including at least the vehicle's lateral acceleration, forward velocity, and yaw rate;
  determining whether the set of conditions satisfies a set of criteria;
  upon a determination that the set of conditions does satisfy the set of criteria,
  calculating a lateral factor, wherein the lateral factor includes a present lateral factor, defined as a function of the vehicle's lateral acceleration, forward velocity, and yaw rate at the time of measurement, and one or more past values of the lateral factor;
  computing a spinout factor based on the calculated lateral factor, wherein the spinout factor indicates the difference between the direction of vehicle travel and the direction the vehicle is heading; and
  generating a warning signal, upon a determination that the spinout factor is above a predefined threshold value;
  wherein the present lateral factor is defined by $\int (a_y - \omega_z^* v_x) dt$, wherein $a_y$ is the vehicle's lateral acceleration, $\omega_z$ is the yaw rate, and $v_x$ is the forward velocity.

2. The method of claim 1, wherein the set of conditions includes one or more of:
  steering wheel angle;
  transmission gears;
  ignition status; or
  wheel speed.

3. The method of claim 1, wherein the set of criteria include one or more conditions limited by their respective thresholds, the conditions being one or more of:
  vehicle speed;
  vehicle velocity; or
  yaw rate.

4. The method of claim 1 further comprising employing the previously calculated value of lateral factor as the present lateral factor, if the set of criteria is not met.

5. The method of claim 4, wherein the calculating step is repeated after a predetermined period of time.

6. The method of claim 1 further comprising:
  counting the number of times the lateral factor has been calculated; and
  assigning the lateral factor a predetermined value, if the lateral factor has been calculated a predetermined number of times.

7. The method of claim 1, wherein the warning signal includes one or more of:
  a visual signal; or
  an audio signal.

8. A system for detecting spinout on an automotive vehicle, comprising:
  a monitoring module adapted to monitor a set of conditions on the vehicle, including at least the vehicle's lateral acceleration, forward velocity, and yaw rate;
  a calculation module configured to calculate a lateral factor, if the conditions meet a set of criteria, wherein the lateral factor includes a present lateral factor, defined as a function of the vehicle's lateral acceleration, forward velocity, and yaw rate at the time of measurement, and one or more past values of the lateral factor;
  a computation module configured to compute a spinout factor based on the calculated lateral factor, wherein the spinout factor indicates the difference between the direction of vehicle travel and the direction the vehicle is heading; and
  a warning module configured to generate a warning signal, upon a determination that the spinout factor is above a predefined threshold value;
  wherein the present lateral factor is defined by $\int (a_y - \omega_z^* v_x) dt$, wherein $a_y$ is the vehicle's lateral acceleration, $\omega_z$ is the yaw rate and $v_x$ is the forward velocity.

9. The system of claim 8, wherein the set of conditions includes one or more of:
  steering wheel angle;
  transmission gears;
  ignition status; or
  wheel speeds.

10. The system of claim 8, wherein the set of criteria measure whether the vehicle's response to the steering wheel angle is within a permissible limit.

11. The system of claim 8, wherein the set of criteria include one or more conditions limited by their respective thresholds, the conditions being one or more of:
  vehicle speed;
  vehicle velocity; or
  yaw rate.

12. The system of claim 8, wherein the calculation module employs the previously calculated value of lateral factor as the present lateral factor, if the set of criteria is not met.

13. The system of claim 12, wherein the calculation module calculates a new lateral factor after a predetermined period of time.

14. The system of claim 8 further comprising:
counting the number of times the lateral factor has been calculated; and
assigning the lateral factor a predetermined value, if the lateral factor has been calculated a predetermined number of times.

15. The system of claim 8, wherein the warning signal includes one or more of:
a visual signal; or
an audio signal.

16. A method for detecting spinout on an automotive vehicle, comprising:
monitoring a set of conditions on the vehicle, including at least the vehicle's lateral acceleration, forward velocity, and yaw rate;
determining whether the set of conditions satisfies a set of criteria;
upon a determination that the set of conditions does satisfy the set of criteria;
calculating a lateral factor, according to an equation:

$$\text{lateral factor}(t) = \text{lateral factor}(t-1) + \int (a_y - \omega_z * v_x) dt,$$

wherein $a_y$ is vehicle lateral acceleration, $v_x$ is forward velocity of the vehicle, and $\omega_z$ is vehicle yaw rate, wherein the lateral factor indicates the lateral velocity;
computing a spinout factor $\lambda$ based on an equation:

$$\lambda = \left(\frac{160}{\pi}\right) * \tan^{-1} \frac{\text{lateral factor}}{\text{longitudinal velocity}},$$

wherein the spinout factor indicates the difference between the direction of vehicle travel and the direction the vehicle is heading; and
generating a warning signal, upon a determination that the spinout factor is above a predefined threshold value.

\* \* \* \* \*